(12) United States Patent
Nishigaki

(10) Patent No.: US 11,060,474 B2
(45) Date of Patent: Jul. 13, 2021

(54) FUEL INJECTION CONTROL DEVICE

(71) Applicant: DENSO CORPORATION, Kariya (JP)

(72) Inventor: Kazuhiro Nishigaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 146 days.

(21) Appl. No.: 16/388,960

(22) Filed: Apr. 19, 2019

(65) Prior Publication Data

US 2019/0242323 A1  Aug. 8, 2019

Related U.S. Application Data

(63) Continuation of application No. PCT/JP2017/042111, filed on Nov. 22, 2017.

(30) Foreign Application Priority Data

Dec. 13, 2016  (JP) ............................. JP2016-241224

(51) Int. Cl.
| | |
|---|---|
| *F02D 41/20* | (2006.01) |
| *F02M 61/04* | (2006.01) |
| *F02M 51/06* | (2006.01) |
| *F02D 41/40* | (2006.01) |
| *F02D 41/30* | (2006.01) |

(52) U.S. Cl.
CPC ............. *F02D 41/20* (2013.01); *F02D 41/30* (2013.01); *F02D 41/402* (2013.01); *F02M 51/061* (2013.01); *F02M 61/04* (2013.01); *F02D 41/2096* (2013.01); *F02D 41/403* (2013.01); *F02D 41/405* (2013.01); *F02D 2041/2003* (2013.01); *F02D 2041/2024* (2013.01); *F02D 2041/2044* (2013.01)

(58) Field of Classification Search
CPC ................ F02D 41/2096; F02D 41/30; F02D 41/402–405; F02D 2041/2003–2013; F02D 2041/2024; F02D 2041/2044
See application file for complete search history.

(56) References Cited

U.S. PATENT DOCUMENTS

| | | |
|---|---|---|
| 5,402,760 A | 4/1995 | Takeuchi et al. |
| 2009/0301431 A1 | 12/2009 | Kawarabayashi et al. |
| 2012/0323468 A1 | 12/2012 | Miyaura et al. |
| 2016/0281624 A1* | 9/2016 | Dames ..................... F02D 41/40 |

(Continued)

FOREIGN PATENT DOCUMENTS

| | | | |
|---|---|---|---|
| JP | 2004-27939 | 1/2004 | |
| JP | 2004-211623 | 7/2004 | |
| WO | WO-2017086189 A1 * | 5/2017 | ........... F02D 41/401 |

*Primary Examiner* — Hung Q Nguyen
*Assistant Examiner* — Mark L. Greene
(74) *Attorney, Agent, or Firm* — Nixon & Vanderhye P.C.

(57) ABSTRACT

A fuel injection control device is for a fuel injection system including a fuel injection valve for injecting a fuel in an internal combustion engine. The fuel injection system is configured to perform multiple-stage injection for injecting fuel multiple times in one combustion cycle. The fuel injection control device includes an information acquisition unit to acquire a parameter, which indicates an influence of a pre-stage injection on a post-stage injection, in the pre-stage injection and the post-stage injection subsequent to the pre-stage injection in the multi-stage injection. The fuel injection control device further includes a correction unit to correct a mode of the post-stage injection based on the parameter.

8 Claims, 7 Drawing Sheets

(56) References Cited

U.S. PATENT DOCUMENTS

2017/0226951 A1    8/2017  Yanoto
2018/0010545 A1*   1/2018  Mukaihara ............ F02D 41/221
2019/0055896 A1*   2/2019  Horiuchi ............... F02D 41/401

* cited by examiner

FUEL INJECTION CONTROL DEVICE

CROSS REFERENCE TO RELATED APPLICATION

The present application is a continuation application of International Patent Application No. PCT/JP2017/042111 filed on Nov. 22, 2017, which designated the U.S. and claims the benefit of priority from Japanese Patent Application No. 2016-241224 filed on Dec. 13, 2016. The entire disclosures of all of the above applications are incorporated herein by reference.

TECHNICAL FIELD

The present disclosure relates to a fuel injection control device for an internal combustion engine.

BACKGROUND ART

Conventionally, a vehicle includes an internal combustion engine equipped with a fuel injection valve for injecting a fuel into a cylinder of an internal combustion engine. Such a fuel injection valve includes a valve body (needle) to regulate the fuel injection.

SUMMARY

According to one aspect of the present disclosure, a fuel injection control device is configured to correct a mode of fuel injection and to control a fuel injection valve.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
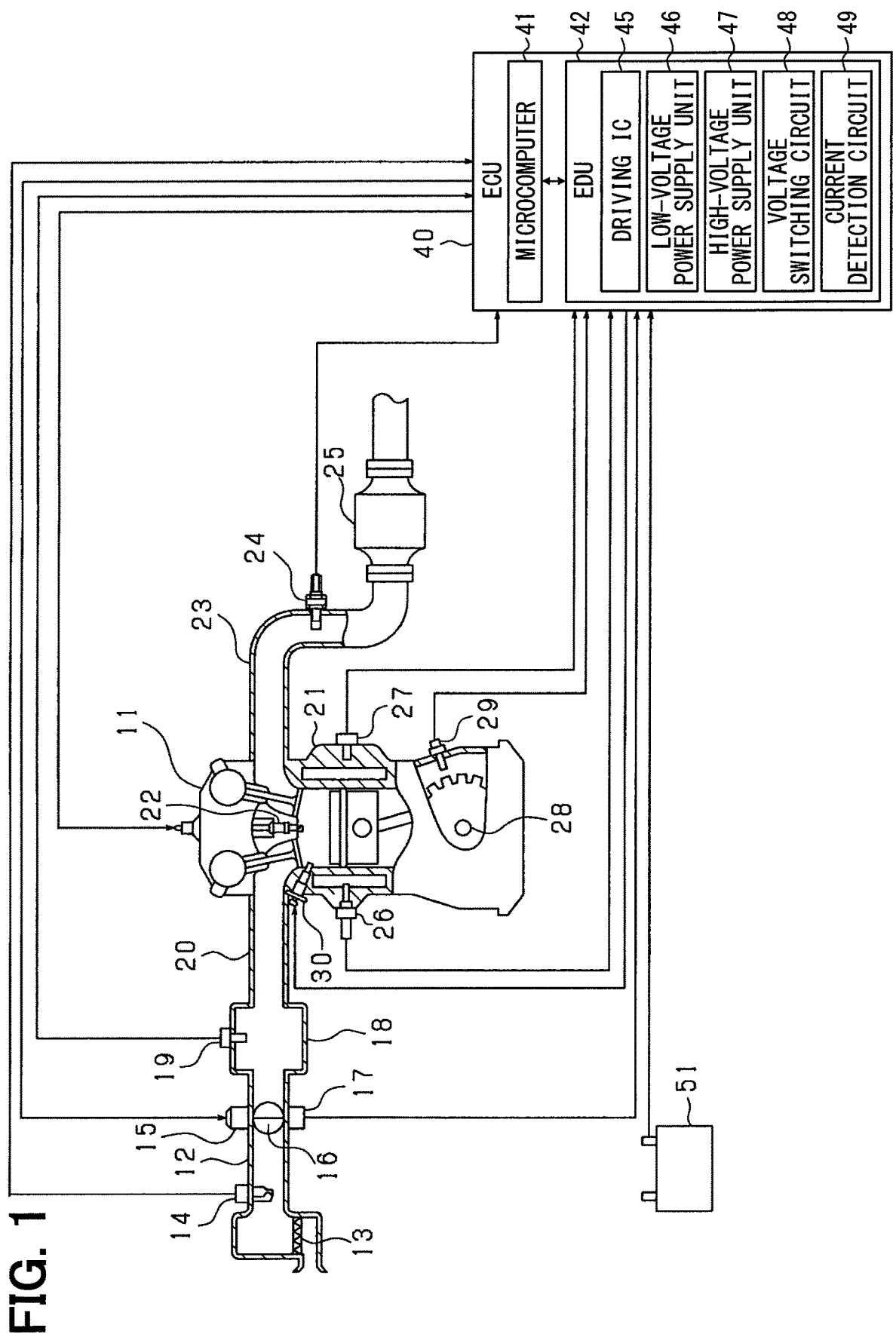
FIG. 1 is a diagram showing a schematic configuration of an engine control system according to a first embodiment.

As follows, a conceivable example of a fuel injection control device will be described. A fuel injection valve injects a fuel into a cylinder of an internal combustion engine of a vehicle. The fuel injection control device according to a conceivable example controls an energization timing and an energization period of a valve main body to drive a valve body (needle) of the fuel injection valve in a valve opening direction. The conceivable example further controls a fuel injection timing and a fuel injection amount. The conceivable example employs multi-stage injection to inject fuel multiple times in one combustion cycle to improve a combustion state of the internal combustion engine.

In the conceivable example, it is further considered that an influence of the fuel injection could remain after the fuel injection has been completed and the valve body has been returned to a valve close state. For example, in a solenoid type fuel injection valve, a magnetic flux could remain even after the valve body has been restored to the valve close state. Thus, a certain period of time could be required for the magnetic flux (residual magnetic flux) to be eliminated. For that reason, in performing the multi-stage injection, a concern could arise that the influence of the operation of a preceding stage would affect a fuel injection in a succeeding stage. Such an influence could hinder optimization of the fuel injection amount in the subsequent injection which is accomplished by reducing an error between a required injection amount and an actual injection amount. In this way, there could be still room to optimize the fuel injection amount in the fuel injection control and to optimize a combustion state.

In consideration of the above-described issues, a fuel injection control device includes an information acquisition unit configured to acquire a parameter, which indicates an influence of a pre-stage injection on a post-stage injection, in the pre-stage injection and the post-stage injection subsequent to the pre-stage injection in the multi-stage injection. The fuel injection control device further includes a correction unit configured to correct a mode of the post-stage injection based on the parameter.

In the multi-stage injection, a fuel is injected multiple times in one combustion cycle to improve the combustion state. In the multi-stage injection, for example, an interval period between the pre-stage injection and the post-stage injection could be reduced due to increase in the number of divisions of the fuel injection. It is noted that, if the interval period is shortened, it is assumable that the influence of the pre-stage injection on the post-stage injection could become remarkable. From this viewpoint, the configuration corrects the mode of the post-stage injection in consideration of the influence of the pre-stage injection on the post-stage injection in the multi-stage injection. For example, when the injection amount of the post-stage injection becomes excessive due to the influence of the pre-stage injection, the configuration regulates the injection amount not to become excessive. As a result, the configuration enables to alleviate a deviation between the required injection amount and the actual injection amount, thereby to contribute to the optimization of the fuel injection amount. In addition, the configuration enables to suitably enhance freedom of the number of divisions and the interval period in one combustion cycle, thereby to facilitate the optimization of the fuel injection amount and the improvement of the combustion state.

Hereinafter, a vehicle control device according to the present disclosure will be described with reference to the drawings.

First Embodiment

A first embodiment is embodied as a control system for controlling a gasoline engine for a vehicle. First, a schematic configuration of an engine control system will be described with reference to FIG. 1.

An air cleaner 13 is provided at an uppermost upstream portion of an intake pipe 12 of an engine 11 which is an in-cylinder injection type multi-cylinder internal combustion engine, and an airflow meter 14 for detecting an intake air amount is provided at a downstream side of the air cleaner 13. A throttle valve 16 whose opening is adjusted by a motor 15 and a throttle opening sensor 17 which detects the opening (throttle opening degree) of the throttle valve 16 are provided on the downstream side of the airflow meter 14.

A surge tank 18 is provided on the downstream side of the throttle valve 16, and an intake pipe pressure sensor 19 for detecting an intake pipe pressure is provided in the surge tank 18. The surge tank 18 is connected to an intake manifold 20 that introduces an air into each cylinder 21 of the engine 11, and each cylinder 21 of the engine 11 is equipped with a solenoid fuel injection valve 30 that directly injects a fuel into the cylinder. An ignition plug 22 is attached to a cylinder head of the engine 11 for each cylinder 21, and an air-fuel mixture in the cylinder is ignited by spark discharge of the ignition plug 22 of each cylinder 21.

An exhaust pipe 23 of the engine 11 is provided with an exhaust gas sensor 24 (an air-fuel ratio sensor, an oxygen sensor, or the like) for detecting an air-fuel ratio, richness/lean, or the like of the air-fuel mixture based on an exhaust gas, and a catalyst 25 such as a three-way catalyst or the like for purifying the exhaust gas is provided on the downstream side of the exhaust gas sensor 24.

A coolant water temperature sensor 26 for detecting a coolant water temperature and a knock sensor 27 for detecting knocking are attached to a cylinder block of the engine 11. A crank angle sensor 29 for outputting a pulse signal every time a crankshaft 28 rotates by a predetermined crank angle is attached to an outer peripheral side of the crank shaft 28, and a crank angle and an engine rotation speed are detected based on a crank angle signal of the crank angle sensor 29.

The outputs of those various sensors are input to an ECU 40. The ECU 40 is an electronic control unit mainly including a microcomputer, and performs various controls of the engines 11 with the use of detection signals detected by the various sensors. The ECU 40 calculates a fuel injection amount according to an engine operation state to control a fuel injection of the fuel injection valve 30, and controls an ignition timing of the ignition plugs 22. An electric power is supplied to the ignition plug 22 and the fuel injection valve 30 from an on-vehicle battery 51.

The ECU 40 includes a microcomputer 41 for engine control (a microcomputer for controlling the engine 11) and an electronic driving unit (EDU) 42 for driving an injector and the like. The microcomputer 41 calculates a required injection amount in accordance with engine operation states (for example, engine rotational speed, an engine load, and so on), generates an injection pulse from an injection period calculated based on the required injection amount, and outputs the injection pulse to the EDU 42. In the EDU 42, the fuel injection valve 30 is driven to open in accordance with the injection pulse to inject the fuel of the required injection amount. The microcomputer 41 corresponds to a "fuel injection control device".

The EDU 42 is provided with a drive IC 45, a low-voltage power supply unit 46, a high-voltage power supply unit 47, a voltage switching circuit 48, and a current detection circuit 49. The voltage switching circuit 48 is a circuit in which a driving voltage applied to the fuel injection valve 30 of each cylinder 21 is switched between a high voltage V2 and a low voltage V1. Specifically, a drive current is supplied to a coil of the fuel injection valve 30 from either the low-voltage power supply unit 46 or the high-voltage power supply unit 47 by turning on or off the switching element (not shown). The low-voltage power supply unit 46 has a low-voltage output circuit for applying the battery voltage (low voltage V1) of the battery 51 to the fuel injection valve 30. The high-voltage power supply unit 47 has a high-voltage output circuit (boosting circuit) that applies the high voltage V2 (boosted voltage) obtained by boosting the battery voltage to 40 V to 70 V to the fuel injection valve 30.

When the fuel injection valve 30 is driven to open by the injection pulse, the low voltage V1 and the high voltage V2 are switched and applied to the fuel injection valve 30 in time series. In this case, the high voltage V2 is applied at an initial stage of valve opening to secure a valve opening responsiveness of the fuel injection valve 30, and the low voltage V1 is subsequently applied to maintain the valve opening state of the fuel injection valve 30.

The current detection circuit 49 detects an energizing current when the fuel injection valve 30 is driven to open, and the detection result is output sequentially to the drive IC 45. The current detection circuit 49 may have a well-known configuration, and includes, for example, a shunt resistor and a comparator.

Figure 2:
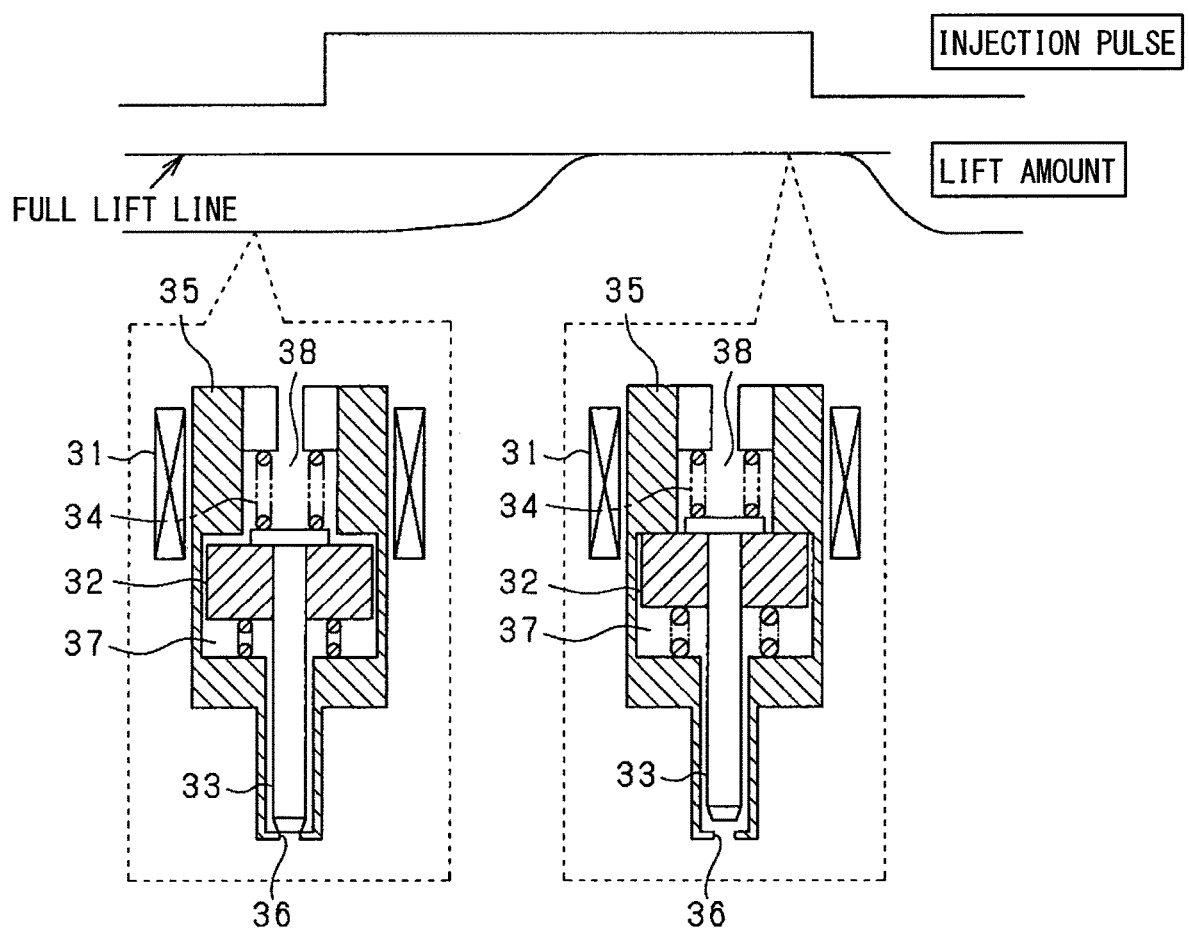
FIG. 2 is a diagram showing a configuration and state of a fuel injection valve.

The fuel injection valve 30 will now be described with reference to FIG. 2. The fuel injection valve 30 includes a coil 31 for generating an electromagnetic force by energization, a needle 33 (valve body) driven integrally with a plunger 32 (movable core) by the electromagnetic force, and a body 35 for accommodating a spring member 34 for urging the plunger 32 in a direction opposite to a valve closing direction, the needle 33, and the like. The body 35 is made of a magnetic material, and configures a magnetic circuit in the fuel injection valve 30.

When the energization of the coil 31 is started in accordance with a rise of the injection pulse, the plunger 32 and the needle 33 move to a valve open position against an urging force of the spring member 34. As a result, the needle 33 is separated from an injection hole 36 of the body 35, and the fuel injection valve 30 becomes a valve open state. Thus, the fuel injection is performed. When the energization of the coil 31 is stopped along with a fall of the injection pulse, the plunger 32 and the needle 33 return to a valve closing position by the urging force of the spring member 34, whereby the fuel injection valve 30 is brought into a valve closed state, and the fuel injection is stopped. In the following description, a position at which the plunger 32 abuts against a stopper to restrict further movement in the valve opening direction is referred to as a "full lift position" of the needle 33.

The body 35 is provided with an accommodation chamber 37 for accommodating the needle 33, and a pressure control chamber 38 for accommodating a command piston that slides in the valve opening direction and the valve closing direction in accordance with a change in an internal fuel pressure. The fuel pressure is exerted on the plunger 32 through a command piston to urge the needle 33 in the valve closing direction. When the fuel injection is performed, the fuel pressure in the pressure control chamber 38 becomes equal to or lower than a predetermined value, so that the command piston moves in the valve opening direction. As a result, the fuel pressure in the accommodation chamber 37 exceeds the fuel pressure in the pressure control chamber 38, and a force in the valve opening direction is applied to the needle 33. As described above, in the configuration in which the needle 33 is urged to the valve closing position by leveraging the fuel pressure, the valve opening responsiveness at the time of fuel injection decreases as the fuel pressure (fuel pressure) increases. When determining the injection pulse for the required injection amount, the injection pulse is adjusted in accordance with the fuel pressure.

Figure 3:
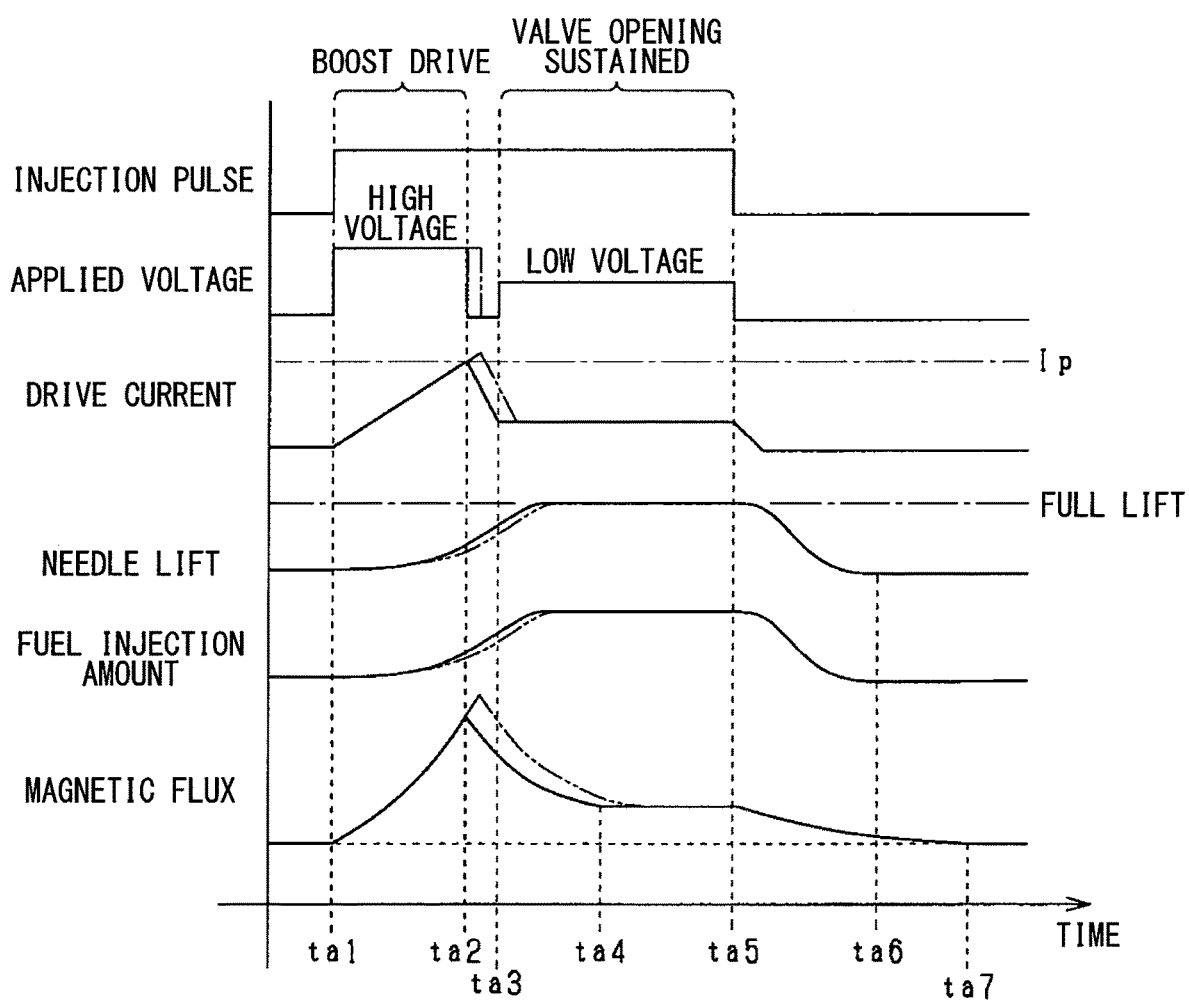
FIG. 3 is a timing chart illustrating driving operation of the fuel injection valve.

Next, referring to FIG. 3, the driving operation of the fuel injection valve 30 performed by the drive IC 45 and the voltage switching circuit 48 based on the injection pulse will be described.

At a time ta1, the high voltage V2 is applied to the fuel injection valve 30 in accordance with the rise of the fuel injection pulse. When the drive current reaches a predetermined target peak value Ip at a time ta2, the application of the high voltage V2 is stopped. At this time, the needle lift is started at a timing at which the drive current reaches the target peak value Ip or at a timing immediately before the drive current reaches the target peak value Ip, and the fuel injection is started along with the needle lift. The determination as to whether or not the drive current has reached the target peak value Ip is performed based on a detection current detected by the current detection circuit 49. In other words, in a boosting period (ta1 to ta2), it is determined whether or not the detection current has become equal to or greater than Ip in the drive IC 45, and at the point of time when the detected current has become equal to or greater than the target peak value Ip, the voltage switching circuit 48 performs switching of the applied voltage (V2 application stop).

At a time ta3, the low voltage V1, which is the battery voltage, is applied to the fuel injection valve 30. As a result, after the needle 33 has reached the full lift position, the full lift state is maintained, and the fuel injection is continued. Thereafter, when the injection pulse is turned off at a time ta5, the application of voltage to the fuel injection valve 30 is stopped, and the drive current becomes zero. Then, the needle lift is terminated along with the stop of the coil energization of the fuel injection valve 30, and the fuel injection is stopped accordingly.

In the solenoid type fuel injection valve 30 described above, a magnetic flux is generated along with the energization. The magnetic flux increases as a current value rises, and converges to a value corresponding to the current value (for example, refer to time ta4 to ta5). The magnetic flux generated in this manner is not eliminated immediately after completion of energization, but remains in the magnetic material portion in the fuel injection valve 30 such as the coil 31, and gradually decreases with the elapse of time. Then, at a time ta7 after a time ta6 at which the needle 33 is returned to the valve closing position, the magnetic flux is eliminated. In the following description, the magnetic flux remaining after the completion of the energization is referred to as a residual magnetic flux.

Figure 4:
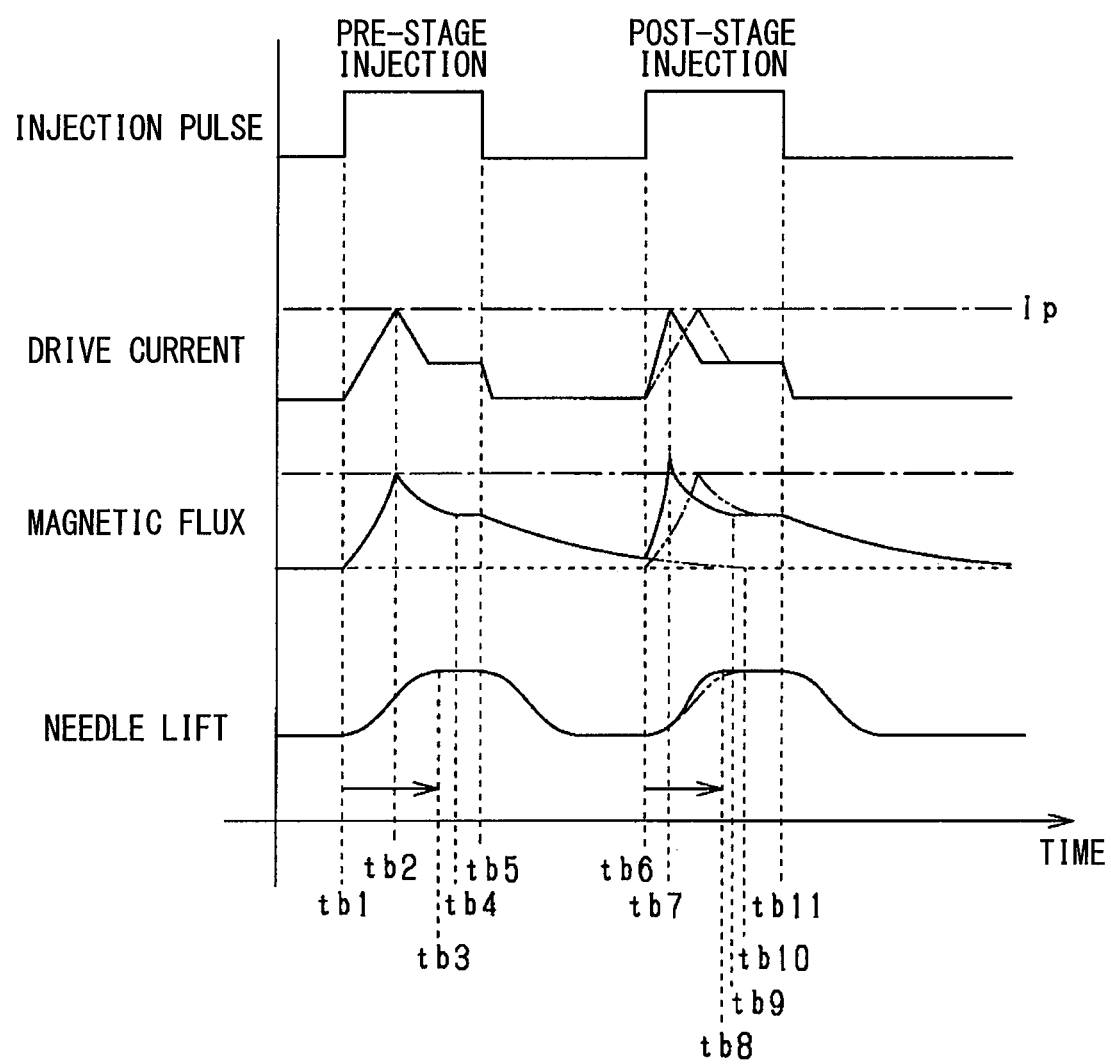
FIG. 4 is a timing chart illustrating the effect of a residual magnetic flux.

If a period from an end of a previous injection to a start of a subsequent injection is longer than a period (residual period) in which the magnetic flux remains, an influence of the residual magnetic flux on the subsequent injection is avoided. In the present embodiment, multi-stage injection in which the fuel is injected multiple times within one combustion cycle is enabled, and the multi-stage injection is executed at the time of a high load or at the time of an acceleration transient. An interval period between the injection of a preceding stage (hereinafter referred to as a pre-stage injection) and the injection of a succeeding stage (hereinafter referred to as a post-stage injection) in the multi-stage injection is variable within a predetermined range, and is set according to the engine rotational speed and the like. Here, when the interval period is shorter than the residual period, the influence of the residual magnetic flux affects the post-stage injection. Hereinafter, the influence of the residual magnetic flux will be described with reference to FIG. 4. FIG. 4 illustrates the pre-stage injection and the post-stage injection in the multi-stage injection, and for convenience of description, also indicates changes in the current, the magnetic flux, and the position of the needle in the case where there is no influence of the residual magnetic flux by two-dot chain lines.

When the energization for the pre-stage injection is started at a time tb1, the magnetic flux increases as the drive current rises. When the drive current decreases due to the switching from the high voltage V2 to the low voltage V1 (time tb2), the magnetic flux decreases accordingly, and converges to a value corresponding to the drive current at the time of the low voltage V1 (time tb4). At a time tb5 when the energization is terminated, the needle 33 starts moving from the full lift position toward the valve closing position. In conjunction with the above operation, the residual magnetic flux also gradually decreases.

When the return of the needle 33 to the valve closing position is completed and the energization for the post-stage injection is started at a time tb6 when the magnetic flux remains, the current value rises rapidly due to the effect of the residual magnetic flux, and the movement of the needle 33 in the valve opening direction is pushed back. In this manner, since the responsiveness of the injection valve is higher than that when there is no residual magnetic flux, a time period required for the needle 33 to reach the full lift position is shortened (refer to the time tb6 to tb8). As a result, in the case of comparison with the same pulse width, a time period for which the needle 33 is held at the full lift position is longer than that in the case of no residual magnetic flux, and the actual fuel injection amount exceeds the required injection amount.

As described above, the residual magnetic flux is the largest immediately after the completion of the energization, and decreases with the elapse of time. For that reason, as an interval between the preceding and succeeding injections is smaller, the effect of the residual magnetic flux is pronounced more, and a deviation between the actual fuel injection amount and the required injection amount becomes larger.

The deviation of the actual injection amount from the required injection amount due to the influence of the residual magnetic flux hinders the optimization of the fuel injection amount. In the present embodiment, in consideration of such a situation, the above-mentioned deviation is reduced by performing correction (pulse correction processing) in consideration of the residual magnetic flux with respect to the post-stage injection in the multi-stage injection. Hereinafter, a pulse correction process will be described with reference to FIG. 5. The pulse correction process is executed when the ECU 40 (microcomputer 41) determines a pulse width of the post-stage injection.

In Step S11 in the pulse width correction process, it is determined whether or not the multi-stage injection is performed in the current fuel injection. If a negative determination is made in Step S11, the pulse correction process is terminated as it is. When an affirmative determination is made in Step S11, the process proceeds to Step S12. In Step S12, an initial value of the residual magnetic flux, more specifically, a value of the residual magnetic flux at the energization completion time is calculated according to the injection pulse width and the fuel pressure at the time of the pre-stage injection. Specifically, the microcomputer 41 stores a map indicating a relationship between the initial value of the residual magnetic flux, the injection pulse width, and the fuel pressure, and calculates the initial value of the residual magnetic flux with reference to the map.

In the fuel injection valve 30 shown in the present embodiment, there is a tendency that the valve opening responsiveness becomes lower as the fuel pressure becomes higher for structural reasons. The target peak value Ip is raised in consideration of the above deterioration in responsiveness. In other words, the width of the injection pulse (in detail a period during which the high voltage V2 is applied) is set to be longer. As a result, the current at the time of energization increases (refer to the two-dot chain line in FIG. 3), and the initial value of the residual magnetic flux may increase. With the calculation of the initial value of the residual magnetic flux in consideration of the fuel pressure, the accuracy is improved.

After the process of Step S12 has been executed, an interval period until the post-stage injection is started is specified in Step S13. Specifically, the microcomputer 41 reads an interval period calculated in advance in response to the injection request.

After the process of Step S13 has been executed, the residual magnetic flux is calculated in Step S14. In the microcomputer 41, a relationship between the initial value of the residual magnetic flux and the interval period is stored in a mapped state in advance, and the residual magnetic flux at the time of starting the post-stage injection is calculated according to the map, the initial value of the residual magnetic flux calculated in Step S12, and the interval period specified in Step S13.

Figure 6:
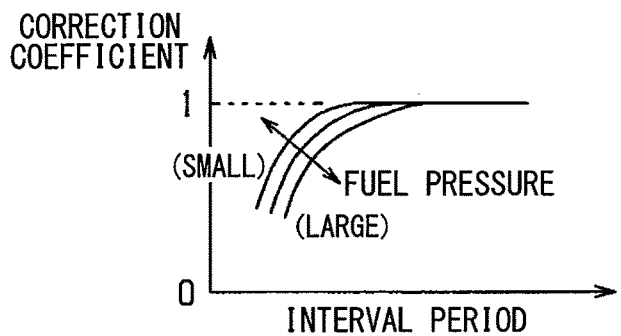
FIG. 6 is a diagram showing a relationship between an interval period and a correction coefficient.
Figure 7:
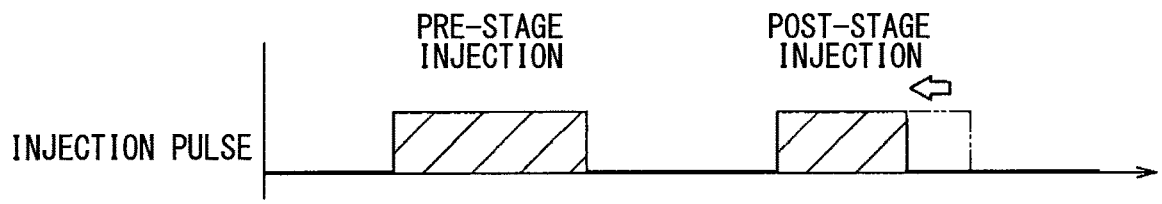
FIG. 7 is a diagram showing a relationship between an injection pulse before correction and an injection pulse after correction.

In the following Step S15, a correction coefficient for correcting the pulse width of the post-stage injection is calculated according to the calculated residual magnetic flux. As shown in FIG. 6, the correction coefficient becomes 1 when the calculated residual magnetic flux is 0, and becomes smaller when the residual magnetic flux increases, that is, when the interval period becomes shorter. In Step S16, the pulse width of the post-stage injection is corrected with the use of (by multiplying) the correction coefficient calculated in Step S15. When the fuel injection amount becomes excessive due to the influence of the residual magnetic flux, the pulse width is reduced so as to cancel the deviation (refer to FIG. 7).

In the present embodiment, the function of calculating the residual magnetic flux based on the pulse width of the pre-stage injection, the fuel pressure, and the interval period until the start of the post-stage injection (Steps S12 to S14) corresponds to an "information acquisition unit", and the function of changing the pulse width using the correction coefficient (Steps S15 to S16) corresponds to a "correction unit".

According to the first embodiment described in detail above, the following excellent advantages are obtained.

At the time of multi-stage injection, the mode of the post-stage injection is corrected in consideration of the influence of the pre-stage injection on the post-stage injection. For example, when the magnetic flux generated at the time of the pre-stage injection remains and the injection amount in the post-stage injection becomes excessive due to the influence of the residual magnetic flux, the correction is performed so as to reduce the injection amount of the post-stage injection. As a result, a deviation between the required injection amount and the actual injection amount can be alleviated, thereby being capable of contributing to the optimization of the fuel injection amount.

In addition, since the mode of the post-stage injection is corrected in consideration of the influence of the pre-stage injection, there is no need to determine the interval period between the pre-stage injection and the post-stage injection in consideration of the residual magnetic flux. Since the influence of the residual magnetic flux can be cancelled even if the interval period is short, the multi-stage injection can be promoted and the combustion state can be suitably improved.

If the residual magnetic flux is estimated from the fuel pressure, the interval period, and the like, the correction coefficient can be calculated before starting the post-stage injection, and the application of the correction coefficient can be restricted from being delayed when the multi-stage injection is actually performed.

As the interval period between the pre-stage injection and the post-stage injection is shorter, the influence (residual magnetic flux) at the time of the pre-stage injection becomes greater. As the residual magnetic flux at the start of the post-stage injection is larger, the needle 33 in the post-stage injection more easily moves in the valve opening direction, as a result of which, the actual injection amount may be larger than the required injection amount. Therefore, if the output time period of the injection pulse is shortened more as the interval period is shortened more, the influence of the residual magnetic flux can be preferably canceled.

Second Embodiment

In the first embodiment, the deviation between the required injection amount and the actual injection amount is reduced by correcting the pulse width of the post-stage injection in accordance with the fuel pressure and the pulse width at the time of the pre-stage injection, the interval period until the post-stage injection, and the like (corresponding to the "parameter"). The present embodiment differs from the first embodiment in the specific configuration (content of the correction process) for reducing the deviation between the required injection amount and the injection amount to be executed. Hereinafter, with reference to FIGS. 8 to 10, the correction process at the time of multi-stage injection in the present embodiment will be described.

Figure 5:
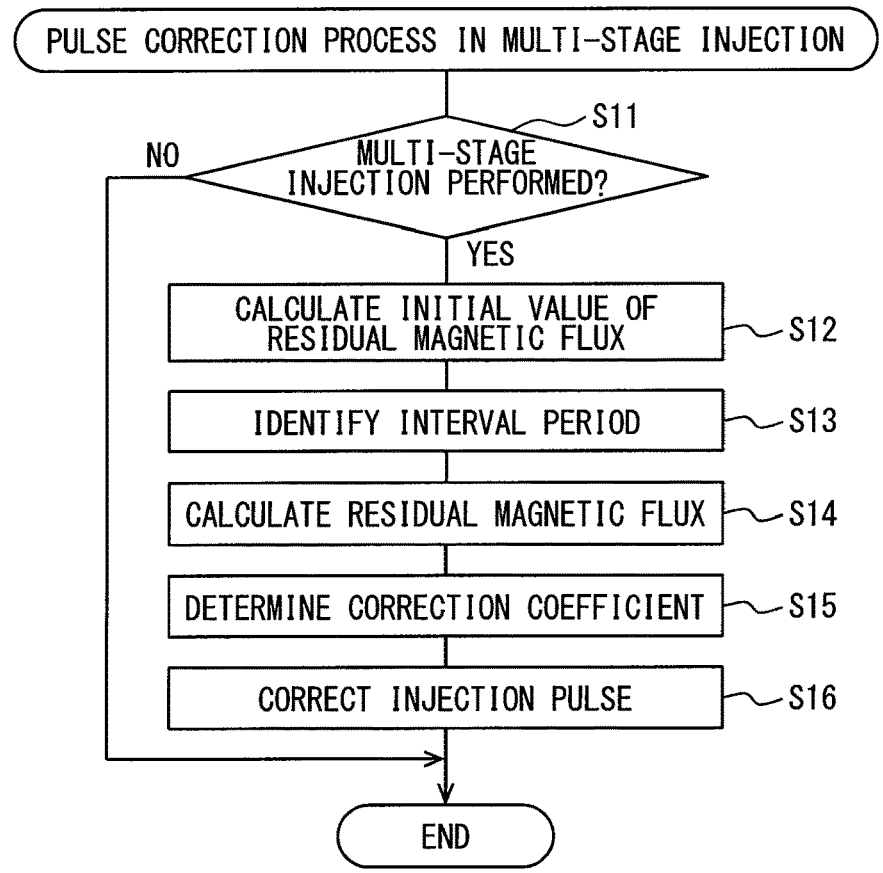
FIG. 5 is a flowchart showing a pulse correction process at the time of divided injection.
Figure 8:
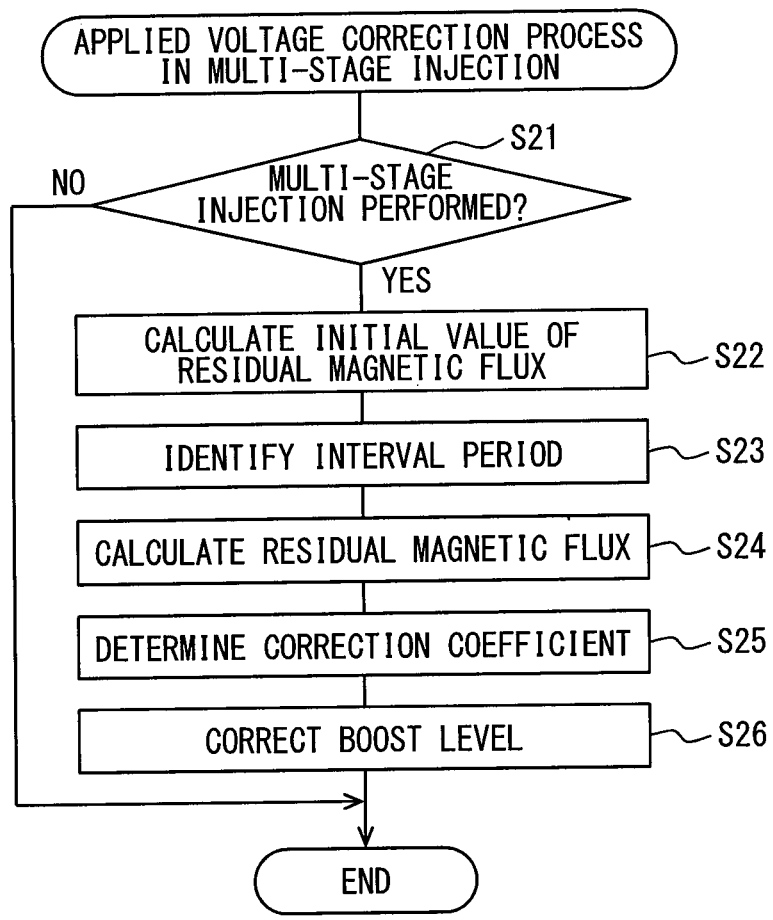
FIG. 8 is a flowchart showing an applied voltage correction process according to a second embodiment.

The applied voltage correction process shown in FIG. 8 is roughly divided into a part for grasping a parameter indicating the influence of the pre-stage injection on the post-stage injection and a part for correcting the fuel injection mode based on the result, similarly to the correction process in the above first embodiment (refer to FIG. 5). In the above parts, the part for grasping the influence of the pre-stage injection (steps S22 to S24) is the same as the process of the Steps S11 to S14 described above, and therefore a description of the part will be omitted.

Figure 9:
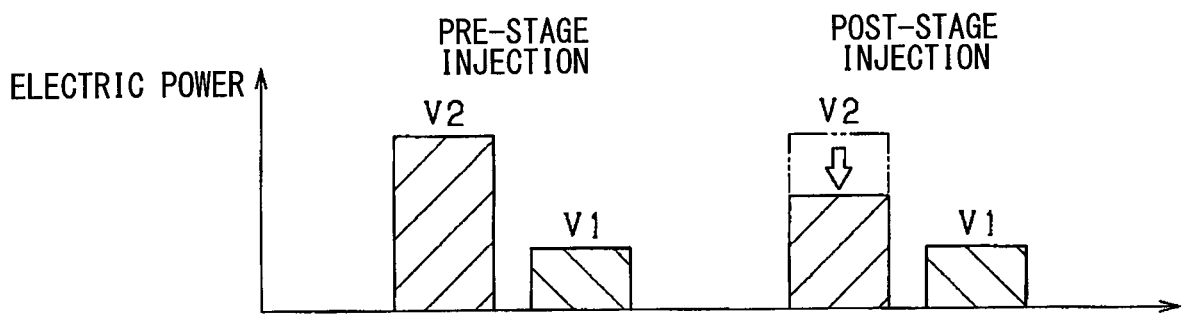
FIG. 9 is a diagram showing a relationship between an applied voltage before correction and an applied voltage after correction.

After the residual magnetic flux at the start of the post-stage injection has been calculated in Steps S22 to S24, a correction coefficient for correcting the applied voltage in the post-stage injection (more specifically, s boost level of the high voltage V2) is determined based on the calculation result. As shown in FIG. 9, the correction coefficient becomes 1 when the calculated residual magnetic flux is 0, and becomes smaller when the residual magnetic flux increases, that is, when the interval period becomes shorter. In Step S26, the boost level (degree) of the high voltage V2 in the post-stage injection is corrected by using (by multiplying) the correction coefficient calculated in Step S25. The high-voltage power supply unit 47 in the present embodiment has multiple output units having different output voltages, and can change the output voltage by switching the output units according to the correction result.

Figure 10:
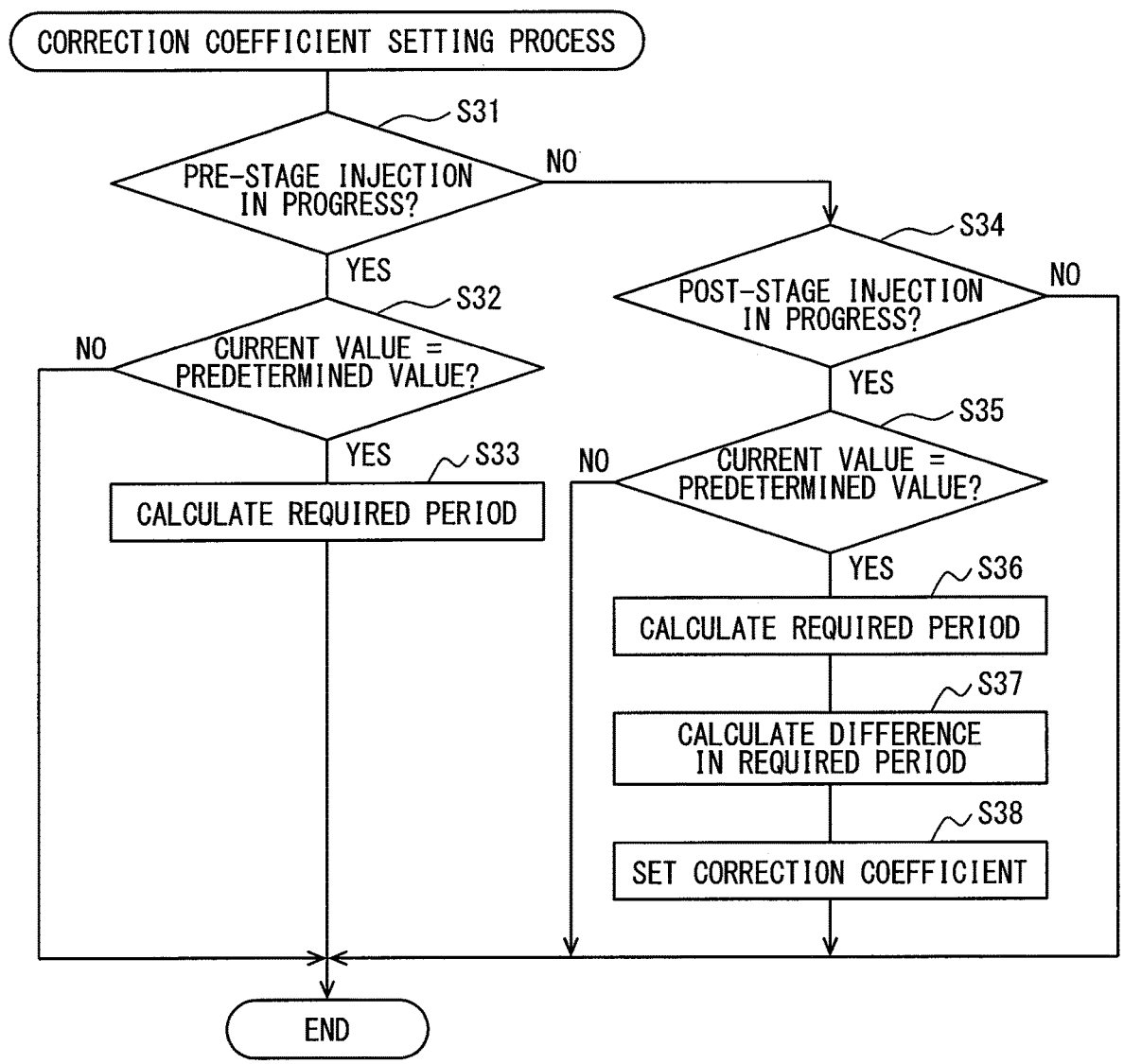
FIG. 10 is a flowchart showing a correction coefficient setting process according to a third embodiment.

When the influence of the residual magnetic flux affects the post-stage injection, the boost level in the post-stage injection is lowered as shown in FIG. 10. As the boost level is lower, the time period required for the needle 33 to reach the full lift position is longer, and the fuel injection amount is smaller as compared in the same injection pulse width. When the fuel injection amount becomes excessive due to the influence of the residual magnetic flux, the boost level is lowered so as to cancel the deviation, thereby being capable of contributing to the optimization of the fuel injection amount.

When the influence of the pre-stage injection affects the post-stage injection, the correction of the boost level shown in the present embodiment and the correction of the injection pulse width shown in the first embodiment can be used in combination in order to reduce the deviation between the required injection amount and the actual injection amount by the influence.

Third Embodiment

In the first embodiment described above, the configuration is employed in which the degree of influence on the post-stage injection is estimated from the mode of the pre-stage injection. The present embodiment differs from the first embodiment in that the effect of the post-stage injection is actually measured. Hereinafter, with reference to FIGS. 4 and 10, a characteristic configuration of the present embodiment, specifically, a correction coefficient setting process executed by the microcomputer 41 when the multi-stage injection is executed as fuel injection will be described.

In the correction coefficient setting process shown in FIG. 10, it is determined in Step S31 whether or not the pre-stage injection in the multi-stage injection is in progress, more specifically, whether or not the high voltage V2 is being applied. When an affirmative determination is made in Step S31, the process proceeds to Step S32. In Step S32, it is determined whether or not it is a timing at which the current value of the drive current reaches a predetermined value. If a negative determination is made in Step S32, the main setting process is terminated as it is. If an affirmative determination is made in Step S32, the process proceeds to Step S33. In Step S33, a required period from the start of energization until the current value reaches the predetermined value is calculated. Thereafter, the present setting process is terminated.

Returning to the description of Step S31, when a negative determination is made in Step S31, that is, when it is determined that the pre-stage injection in the multi-stage injection is not being performed, the process proceeds to Step S34. In Step S34, it is determined whether or not the post-stage injection in the multi-stage injection is in progress, more specifically, whether or not the high voltage V2 is being applied. If a negative determination is made in Step S34, the main setting process is terminated as it is. If an affirmative determination is made in Step S34, the process proceeds to Step S35.

In Step S35, it is determined whether or not it is a timing at which the current value of the drive current reaches a predetermined value. If a negative determination is made in Step S35, the main setting process is terminated as it is. If an affirmative determination is made in Step S35, the process proceeds to Step S36. In Step S36, a required period from the start of the energization until the current value reaches the predetermined value is calculated.

After the process of Step S36 has been executed, a difference in required period is calculated in Step S37. When the post-stage injection is started under the condition that the magnetic flux generated in the pre-stage injection remains, the mode of increase of the drive current changes. More specifically, the drive current rises at a higher rate due to the influence of the residual magnetic flux (refer to FIG. 4). For that reason, the required period is shortened as compared with the case where there is no influence of the residual magnetic flux. In the present embodiment, the difference in the required period calculated in Step S37 corresponds to "correspondence information" indicating the influence of the residual magnetic flux.

Figure 11:
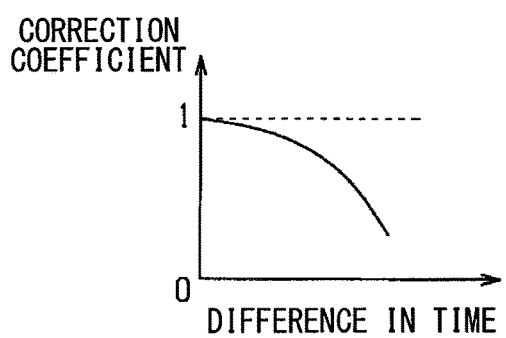
FIG. 11 is a diagram showing a relationship between a difference in a required period and a correction coefficient.

In the following Step S38, a correction coefficient is set based on the difference in the required period calculated in Step S37. More specifically, the microcomputer 41 stores a map (refer to FIG. 11) showing the relationship between the difference in the required period and the correction coefficient, and determines the correction coefficient with reference to the map. The determined correction coefficient is stored in association with a variable condition such as an interval period.

In the map, the correction coefficient is 1 when the difference in the required period is 0, and the correction coefficient is smaller (the degree of correction is greater) when the difference in the required period is large than that when the difference in the required period is small.

After the correction coefficient has been set in Step S38, the present setting process is completed. Unlike the first embodiment, in the present embodiment, since the correction coefficient is set with reference to both the drive current in the pre-stage injection and the drive current in the post-stage injection, the correction coefficient set this time is not applied to the multi-stage injection which is the detection target. In other words, the set correction value is applied to the subsequent combustion cycles of the same cylinder, more specifically, the combustion cycle executed under the same condition as that at the time of setting the correction coefficient, and the fuel injection mode is corrected by applying the set correction coefficient. The correction may be performed by adjusting the output period of the injection pulse as shown in the first embodiment (refer to, for example, FIG. 7) or by adjusting the boost level of the high voltage V2 (refer to, for example, FIG. 9).

As described above in detail, if the difference between the waveform of the drive current at the time of the pre-stage injection and the waveform of the drive current at the time of the post-stage injection is used to find out how much the influence of the pre-stage injection affects the post-stage injection, the certainty of the correction coefficient can be suitably improved.

Other Embodiments

In each of the embodiments described above, a configuration in which the fuel is divided into two parts and injected into a single combustion cycle has been described, but the number of divisions is arbitrary. When the number of divisions is 3 or more, there is a possibility that the influence of the preceding fuel injection is accumulated. For example, when the second fuel injection is affected by the first fuel injection while the third fuel injection is affected by the first and second fuel injections, it is preferable that the second fuel injection and the third fuel injection are distinguished from each other to determine the mode of correction.

In each of the embodiments described above, the case in which the injection amount in the pre-stage injection and the injection amount in the post-stage injection coincide with each other has been exemplified, but the injection amount in each injection in the case where the divided injection is performed is arbitrary. The injection amounts of the preceding stage and the succeeding stage may be varied in accordance with the operating condition of the engine 11 or the like. As the injection amount of the post-stage injection is smaller, the influence of the error between the required injection amount and the actual injection amount becomes larger. In view of the circumstances described above, it is technically meaningful to configure the above correction when the injection amount of the post-stage injection is small, for example, when the injection amount of the post-stage injection is lower than the injection amount of the pre-stage injection.

When the energization of the fuel injection valve 30 is completed, the needle 33 returns to the initial position. The needle 33 may bounce back and rock when the needle 33 is returned to its initial position. If the next fuel injection is performed before the rocking is stopped, the influence of the rocking may affect the next injection. Therefore, in the case where the setting range of the interval period of the pre-stage injection and the post-stage injection overlaps with the rocking period, that is, in the case where the fuel injection is started during rocking, it is preferable to adopt a configuration in which the effect of the rocking is added to the above-mentioned correction involved in the post-stage injection to correct the injection mode.

The drive current when the fuel injection valve 30 is driven depends on the voltage. When the valve is maintained to open by applying the battery voltage (low voltage (V1)), the residual magnetic flux may increase or decrease in accordance with the battery voltage. In consideration of the possibility that the battery voltage deviates from the reference voltage due to the influence of aging, or the like, when the influence of the pre-stage injection is calculated according to the pulse width at the time of the pre-stage injection, the fuel pressure, and the interval period until the start of the post-stage injection, it is preferable to take the battery voltage (for example, the voltage at the time of the end of the pre-stage injection) into consideration in addition to those various information.

In the first and second embodiments, the initial value of the residual magnetic flux is calculated according to the pulse width and the fuel pressure of the pre-stage injection when the multi-stage injection is performed, and the residual magnetic flux at the start of the post-stage injection is calculated according to the initial value and the interval period until the post-stage injection, but it is arbitrary whether or not the calculation of the initial value is performed when the residual magnetic flux at the start of the post-stage injection is calculated. For example, the residual magnetic flux at the start of the post-stage injection may be directly obtained according to the pulse width, the fuel pressure, and the interval period of the pre-stage injection.

In the first and second embodiments, the correction value is determined in accordance with the width of the injection pulse (energization period). The parameter indicating the influence of the pre-stage injection on the post-stage injection is not limited to the width of the injection pulse or the like. The correction value can be determined on the basis of the energization amount to the fuel injection valve 30 (for example, the integrated amount of the drive current or the peak value of the drive current). The correction value may be determined on the basis of the multiple parameters related to the drive current (for example, both parameters of the width of the injection pulse and the amount of energization).

In the third embodiment, the drive current at the time of the pre-stage injection and the drive current at the time of the post-stage injection are compared with each other, and the influence of the pre-stage injection is specified according to the difference in the change of the drive current, but the present disclosure is not limited to the above configuration. The microcomputer 41 may be configured to store a change in the drive current serving as a reference, and compare the drive current as the reference with the drive current at the time of the post-stage injection to specify the influence of the pre-stage injection.

In the third embodiment, the influence of the residual magnetic flux is specified by comparing the time until the drive current reaches the predetermined amount with each other, but the present disclosure is not limited to the above configuration. For example, the influence of the residual magnetic flux may be specified by comparing the current increase amount of the drive current per unit time after the start of the energization, or the influence of the residual magnetic flux may be specified by comparing the current value after a predetermined waiting time has elapsed from the start of the energization with each other.

Although the fuel injection valve 30 shown in each of the embodiments described above is configured to urge the needle 33 in the valve closing direction by leveraging the fuel pressure, it is arbitrary how to urge the needle 33, and there is no need to necessarily use the fuel pressure.

Although the magnetic flux density is calculated according to the drive current in each of the embodiments described above, the magnetic flux density can be measured with the use of a magnetic sensor or the like.

In each of the embodiments described above, the case where the drive unit of the fuel injection valve 30 is a solenoid has been exemplified, but the specific configuration of the drive unit of the fuel injection valve 30 is arbitrary. For example, a piezoelectric actuator may be used. The operation of the piezoelectric actuator is started when the amount of accumulated charge is maximized. When the energization is completed, the amount of electric charge decreases and the piezoelectric actuator returns to an original position, but when the electric charge is re-energized in an electric charge decreasing process (state where the electric charge remains), a time period required for the operation to start is shortened. In view of the circumstances described above, the deviation between the required injection amount and the actual injection amount can be suitably alleviated by performing correction such as shortening the pulse width in a situation where the piezoelectric actuator is energized again before the electric charge has been discharged.

As described above, an example of the present disclosure relates to a fuel injection control device, which is for a fuel injection system including a fuel injection valve to inject a fuel in an internal combustion engine. The fuel injection system is configured to execute multi-stage injection to inject the fuel multiple times in one combustion cycle. The fuel injection control device is configured to control driving of the fuel injection valve. The fuel injection control device comprises an information acquisition unit configured to acquire a parameter, which indicates an influence of a pre-stage injection on a post-stage injection, in the pre-stage injection and the post-stage injection subsequent to the pre-stage injection in the multi-stage injection. The fuel injection control device further comprises a correction unit configured to correct a mode of the post-stage injection based on the parameter.

In the case of employing multi-stage injection in which the fuel is injected multiple times in one combustion cycle to improve the combustion state, for example, an interval period between the pre-stage injection and the post-stage injection could be reduced due to increase in the number of divisions of the fuel injection. If the interval period is shortened, it is assumable that the influence of the pre-stage injection on the post-stage injection could become remarkable. From this viewpoint, the configuration corrects the mode of the post-stage injection in consideration of the influence of the pre-stage injection on the post-stage injection in the multi-stage injection. For example, when the injection amount of the post-stage injection becomes excessive due to the influence of the pre-stage injection, the configuration regulates the injection amount not to become excessive. As a result, the configuration enables to alleviate a deviation between the required injection amount and the actual injection amount, thereby to contribute to the optimization of the fuel injection amount. In addition, the configuration enables to suitably enhance freedom of the number of divisions and the interval period in one combustion cycle, thereby to facilitate the optimization of the fuel injection amount and the improvement of the combustion state.

Although the present disclosure has been described in accordance with the examples, it is understood that the present disclosure is not limited to such examples or structures. The present disclosure encompasses various modifications and variations within the scope of equivalents. In addition, various combinations and configurations, as well as other combinations and configurations that include only one element, more, or less, are within the scope and spirit of the present disclosure.

The invention claimed is:

1. A fuel injection control device for a fuel injection system including a fuel injection valve to inject a fuel in an internal combustion engine, the fuel injection system configured to execute multi-stage injection to inject the fuel multiple times in one combustion cycle, the fuel injection control device configured to control driving of the fuel injection valve, the fuel injection control device comprising:
a computer configured at least to perform:
an information acquisition to acquire a parameter, which indicates an influence of a pre-stage injection on a post-stage injection, in the pre-stage injection and the post-stage injection subsequent to the pre-stage injection in the multi-stage injection; and
a correction to correct a mode of the post-stage injection based on the parameter, wherein
the information acquisition is configured to acquire, as the parameter, an interval period between the pre-stage injection and the post-stage inject,
the correction is configured to correct the mode of the post-stage injection based on the interval period,
when driving the fuel injection valve, the fuel injection system is configured to apply a predetermined high voltage in accordance with a start of the driving of the fuel injection valve, and to apply a predetermined low voltage after the application of the predetermined high voltage, and
the correction is configured to lower the predetermined high voltage applied when the post-stage injection is performed as the correction of the mode of the post-stage injection, in a case where the interval period is short compared to a case where the interval period is long.

2. The fuel injection control device according to claim 1, wherein
the correction is configured to shorten a driving period of the fuel injection valve when performing the post-stage injection as the correction of the mode of the post-stage injection, in the case where the interval period is short compared to the case where the interval period is long.

3. The fuel injection control device according to claim 1, wherein:
the computer is further configured to perform a residual magnetic flux calculation calculate an initial value of a residual magnetic flux remaining after completion of energization of the pre-stage injection, wherein
the correction is configured to correct a driving period of the fuel injection valve based on the interval period and the initial value of the residual magnetic flux when performing the post-stage injection.

4. A fuel injection control device for a fuel injection system including a fuel injection valve to inject a fuel in an internal combustion engine, the fuel injection system configured to execute multi-stage injection to inject the fuel multiple times in one combustion cycle, the fuel injection control device configured to control driving of the fuel injection valve, the fuel injection control device comprising:
a computer configured at least to perform:
an information acquisition to acquire a parameter, which indicates an influence of a pre-stage injection on a post-stage injection, in the pre-stage injection and the post-stage injection subsequent to the pre-stage injection in the multi-stage injection; and
a correction to correct a mode of the post-stage injection based on the parameter, wherein
the information acquisition is configured to acquire, as the parameter, an amount of energization on the fuel injection valve in the pre-stage injection, and
the correction is configured to correct the mode of the post-stage injection based on the amount of energization;
when driving the fuel injection valve, the fuel injection system is configured to apply a predetermined high voltage in accordance with a start of the driving of the fuel injection valve, and applies a predetermined low voltage after the application of the predetermined high voltage, and
the correction is configured to lower the predetermined high voltage applied when the post-stage injection is performed as the correction of the mode of the post-stage injection, in a case where the amount of energization at the time of the pre-stage injection is large compared to a case where the amount of energization is small.

5. The fuel injection control device according to claim 4, wherein
the correction is configured to shorten the driving period of the fuel injection valve when performing the post-stage injection as the correction of the mode of the post-stage injection, in the case where the amount of energization at the time of the pre-stage injection is large compared to the case where the amount of energization is small.

6. A fuel injection control device for a fuel injection system including a fuel injection valve to inject a fuel in an internal combustion engine, the fuel injection system configured to execute multi-stage injection to inject the fuel multiple times in one combustion cycle, the fuel injection control device configured to control driving of the fuel injection valve, the fuel injection control device comprising:

a computer configured at least to perform:
- an information acquisition to acquire a parameter, which indicates an influence of a pre-stage injection on a post-stage injection, in the pre-stage injection and the post-stage injection subsequent to the pre-stage injection in the multi-stage injection; and
- a correction configured to correct a mode of the post-stage injection based on the parameter, wherein the fuel injection control device for the fuel injection system including a current detection circuit configured to detect a drive current of the fuel injection valve, the information acquisition is configured to acquire, as the parameter, a current change parameter indicating a rising change of the drive current after the start of energization of the post-stage injection, and the correction is configured to correct the mode of the post-stage injection based on the current change parameter.

7. The fuel injection control device according to claim 6, wherein the correction is configured to shorten the driving time in the post-stage injection as the correction of the mode of the post-stage injection, in a case where a rate of increase in the current change parameter is large, as compared to a case where the rate of increase in the current change parameter is small.

8. The fuel injection control device according to claim 6, wherein when driving the fuel injection valve, the fuel injection system is configured to apply a predetermined high voltage in accordance with a start of the driving of the fuel injection valve, and to apply a predetermined low voltage after the application of the predetermined high voltage, and the correction is configured to lower the predetermined high voltage applied in the post-stage injection as the correction of the mode of the post-stage injection, in a case where a rate of change in the current change parameter is large compared to a case where the rate of change in the current change parameter is small.

* * * * *